United States Patent

Joao et al.

[11] Patent Number: 5,839,081
[45] Date of Patent: *Nov. 17, 1998

[54] APPARATUS AND METHOD FOR VEHICLE ANTI-THEFT

[76] Inventors: Raymond Anthony Joao; Raymond Delfim Joao, both of 122 Bellevue Pl., Yonkers, N.Y. 10703

[ * ] Notice: The term of this patent shall not extend beyond the expiration date of Pat. No. 5,612,878.

[21] Appl. No.: 818,560

[22] Filed: Mar. 14, 1997

Related U.S. Application Data

[63] Continuation of Ser. No. 493,855, Jun. 22, 1995, Pat. No. 5,612,878.

[51] Int. Cl.⁶ .................................................. B60R 25/00
[52] U.S. Cl. .............................. 701/36; 70/256; 180/287; 307/10.2
[58] Field of Search ...................... 364/423.098, 424.045; 180/287, 289; 307/10.2; 70/237, 256, 257; 340/426; 701/1, 36

[56] References Cited

U.S. PATENT DOCUMENTS

| | | | |
|---|---|---|---|
| 3,720,284 | 3/1973 | Myers | 180/287 |
| 4,665,692 | 5/1987 | Inaba | 60/324 |
| 4,683,735 | 8/1987 | Magrobi | 180/287 X |
| 4,690,240 | 9/1987 | Russo | 180/287 |
| 4,696,368 | 9/1987 | Hummel et al. | 180/287 X |
| 4,699,244 | 10/1987 | Bergquist et al. | 181/226 |
| 4,805,722 | 2/1989 | Keating et al. | 180/287 |
| 4,834,207 | 5/1989 | Havenhill et al. | 180/287 |
| 5,052,204 | 10/1991 | Millar | 70/256 |
| 5,168,957 | 12/1992 | Ross | 180/287 |
| 5,193,641 | 3/1993 | Durrell | 180/287 |
| 5,249,442 | 10/1993 | Wright | 70/164 |
| 5,359,868 | 11/1994 | Villani | 70/203 |
| 5,370,201 | 12/1994 | Inubushi | 180/287 |
| 5,499,653 | 3/1996 | Kerry | 137/354 |
| 5,535,844 | 7/1996 | Samford | 180/287 |
| 5,563,576 | 10/1996 | Drori et al. | 340/455 |

*Primary Examiner*—Michael Zanelli
*Attorney, Agent, or Firm*—Raymond A. Joao

[57] ABSTRACT

An anti-theft apparatus which comprises a blocking element for blocking the flow of exhaust gases, a device for moving the blocking element and a control device for controlling one of the apparatus and the moving device. The apparatus also comprises an activation device, for activating an operation of one of the apparatus and the control device, and a housing for housing at least one of the blocking element, the moving device and the control device. The moving device one of moves and displaces the blocking element between a first position, whereat the blocking element is removed from the flow path of exhaust gases, and a second position, whereat the blocking element is in the flow path of exhaust gases.

20 Claims, 9 Drawing Sheets

APPARATUS AND METHOD FOR VEHICLE ANTI-THEFT

This is a continuation application of application Ser. No. 08/493,855, filed Jun. 22, 1995 now U.S. Pat. No. 5,612,878.

FIELD OF THE INVENTION

The present invention pertains to an apparatus and a method for motor vehicle anti-theft and/or theft-deterrence, and in particular, to an apparatus and a method for blocking off or sealing off a motor vehicle's exhaust system, thereby blocking or inhibiting the release of a motor vehicle's exhaust gases into the atmosphere, thereby rendering the motor vehicle inoperable.

BACKGROUND OF THE INVENTION

Various types of security devices and systems for motor vehicle anti-theft and/or theft deterrence are known. It is well known that a motor vehicle combustion engine requires fuel, an ignition spark and oxygen in order to operate. Most anti-theft and/or theft deterrent devices and systems are designed for eliminating fuel (i.e. fuel cutoff devices) and for eliminating the ignition spark (i.e. starter cutoff devices, ignition cutoff devices, etc). While these devices, which target fuel and ignition spark, are well known, they have come to be easily overcome by sophisticated car thieves.

In addition to the above described devices, devices are also known which attempt to prevent a vehicle theft by blocking off the vehicle's exhaust system so as to eliminate oxygen intake by the engine.

Exhaust pipe locks are known which are inserted within the end of the exhaust pipe or tail pipe. These exhaust pipe locks, however, may be inconvenient to install and, therefore, to use, and may also be easily and readily accessible to a would-be car thief who may easily defeat or overcome same.

Other exhaust system devices are known which utilize blocking devices which are permanently placed or located within a section of the vehicle's exhaust pipe and directly in the path of flow of the exhaust gases. These devices, however, by virtue of their design, may fail to adequately and completely block off the exhaust system, thereby allowing limited exhaust operation. Further, the blocking devices used in these devices, which are permanently installed in the exhaust pipe, introduces a partial blockage in the exhaust pipe and in the flow of the exhaust gases which may serve to present opposition to the normal flow of exhaust gases through the exhaust system during normal operation, which may further result in adverse affects during normal vehicle operation.

It can be seen that known anti-theft and/or theft-deterrent devices may have very limited uses and may present: many disadvantages and shortcomings in their utilization. In this regard, there is a need for a motor vehicle anti-theft and/or theft-deterrent device which overcomes the shortcomings of the prior art devices and which serves to effectively and efficiently provide for a selective and a complete blocking off or sealing off of a motor vehicle's exhaust system, so as to eliminate an engine's oxygen intake and, therefore, so as to render a motor vehicle inoperable or operable at a greatly reduced power level. At the same time, there is also a need for a device which, in addition to the above, requires no permanent placement of a device(s) in the path of flow of the exhaust gases.

SUMMARY OF THE INVENTION

The present invention is directed to an apparatus and a method for motor vehicle anti-theft and/or theft-deterrence which serves to overcome the shortcomings of prior art anti-theft and/or theft deterrent devices and systems.

The anti-theft apparatus of the present invention may comprise a transmitter/receiver combination as an actuation means, and a control means. The apparatus may also be activated and/or controlled by conventional actuation and/or switching devices configured in an appropriate electrical circuit arrangement. The control means may also be programmable so as to selectively program apparatus operation. The anti-theft apparatus also comprises a blocking device moving means which is controllable by the control means and a blocking device which is utilized to selectively block and unblock the motor vehicle exhaust system, pipe or line. The blocking device should serve to completely seal off the exhaust system when it is utilized to block same.

The blocking device moving means may further comprise a reversible DC electric motor and a mechanical linkage for mechanically connecting the blocking device moving means to the blocking device so as to provide for the moving or the displacing of the blocking device in either one of two directions between desired positions. The apparatus should be powered by the motor vehicle power supply.

The apparatus of the present invention and/or any of its components may also be powered by any other suitable power source or supply and may have auxiliary power supplies associated therewith for utilization in case of power interruption(s). Auxiliary power supplies may also be solar-powered.

The apparatus may also utilize blocking device position sensor devices for sensing the position of the blocking device. The apparatus may also comprise a fail-safe device which serves to sense if the vehicle power supply is or has been disconnected and, if necessary, serves to activate associated auxiliary power supply circuits.

The DC motor provides control over the physical movement and/or the displacement of the blocking device. The DC motor is a reversible motor so that the blocking device may be moved in opposite directions to and between pre-defined positions. The linkage facilitates the movement or the displacement of the blocking device in conjunction with the DC motor.

The blocking device is utilized so as to be removably inserted directly into the vehicle's exhaust system, pipe or line (hereinafter "exhaust system"), so as to completely block off, or seal off, the exhaust system, thereby preventing the release of engine exhaust gases into the atmosphere, thereby preventing the introduction or intake of oxygen into the combustion engine. The blocking device moving means serves, via the DC motor and linkage, to physically move or displace the blocking device during operation. The blocking device can be utilized in conjunction with a guide track within which the blocking device may be guided and supported.

The apparatus also comprises a housing and an appropriate electrical line cord for supplying power from the vehicle power supply or from alternate, or auxiliary, sources to the apparatus components. A cutout, or cylindrically-shaped passageway, is also formed in the housing which facilitates the connection and/or the installation of the apparatus into the vehicle's exhaust system. The housing houses and, therefore, provides protection for many of the essential components of the anti-theft apparatus.

The blocking device is movable between two extreme positions. In an "UNBLOCK" position, the blocking device is completely removed from, or located outside of, the engine's exhaust system. When and if desired, the blocking device can be moved or displaced, via the blocking device moving means, until it reaches a "BLOCK" position whereat the blocking device is directly in, and completely blocks off or seals off, the cutout or passageway thereby completely blocking off or sealing off the exhaust system of the motor vehicle, and thereby preventing the release of exhaust gases into the atmosphere. When and if it is desired to unblock the exhaust system, the blocking device can be once again moved or displaced, via the blocking device moving means, back to the "UNBLOCK" position.

The failure or the inability to release engine exhaust gases into the atmosphere prevents the flow of air, and therefore, the flow of oxygen, into the vehicle engine's combustion chambers. The vehicle engine will be rendered inoperable in the absence of oxygen which is a necessary component in the combustion process.

The cutting off, or by eliminating, the flow of oxygen into the engine, the motor vehicle engine would either fail to start or cease to operate shortly after starting. Of course, in cases where an exhaust system may contain leaks, or which may be in need of repair, some exhaust gases may be released into the atmosphere and the engine may still operate, however, such operation may be at a greatly reduced power level which may serve to thwart, or to severely hamper, efforts to steal the motor vehicle.

The anti-theft apparatus of the present invention may be installed in a motor vehicle's exhaust system in any appropriate manner. The anti-theft apparatus housing may be installed in and/or inserted into, the motor vehicle's exhaust system at any suitable location and by any one of the widely known vehicle equipment or exhaust system device installation techniques.

The housing and other components of the apparatus may be constructed of any suitable materials as long as the apparatus may operate properly. The housing of the apparatus, and the components housed therein, may also be integrally fabricated within a vehicle muffler, an exhaust manifold, a catalytic converter, exhaust pipe section, or any other appropriate exhaust system device or component.

The apparatus of the present invention may also be adapted to, and may be utilized in conjunction with, a vehicle's fuel supply line so as to provide a means for cutting off, or blocking, the flow of fuel from the vehicle fuel tank to the vehicle engine.

Accordingly, it is an object of the present invention to provide an apparatus and a method for an anti-theft and/or theft deterrent apparatus and method which selectively and completely blocks or unblocks a motor vehicle exhaust system.

It is yet another object of the present invention to provide a motor vehicle anti-theft apparatus and a method for selectively and completely blocking or unblocking the release of a motor vehicle engine's exhaust gases into the atmosphere.

It is yet another object of the present invention to provide a motor vehicle anti-theft apparatus and a method for selectively and completely blocking or unblocking a motor vehicle exhaust system which may be activated by a remote transmitter, a key, a keypad, a switch, or by any one or combination of the widely known card/card reader systems and/or by telephone/telephone beeper systems.

It is still another object of the present invention to provide a motor vehicle anti-theft apparatus and a method for selectively and completely blocking or unblocking a motor vehicle exhaust system which provides for a fail-safe system and/or which prevents vehicle theft in the event a vehicle's power source is disconnected or interrupted.

It is yet another object of the present invention to provide a motor vehicle anti-theft apparatus which provides for the installation and/or the placement thereof at any suitable location in the motor vehicle exhaust system.

It is yet another object of the present invention to provide a motor vehicle anti-theft apparatus which provides for a complete removal of a blocking device from the motor vehicle exhaust system.

It is yet another object of the present invention to provide a motor vehicle anti-theft apparatus, for selectively and completely blocking a motor vehicle exhaust system, which is controllable by a remote transmitter.

It is yet another object of the present invention to provide a motor vehicle anti-theft apparatus which can be constructed as an integral part of a motor vehicle exhaust system component such as a muffler, an exhaust manifold, a catalytic converter or an exhaust pipe section.

It is still another object of the present invention to provide an anti-theft apparatus, for providing the selective blocking or unblocking of a vehicle's exhaust system, which comprises a microprocessor or central processing unit for providing control over the apparatus.

It is still another object of the present invention to provide an anti-theft apparatus for motor vehicles, for selectively and completely blocking or unblocking a vehicle exhaust system, which is programmable.

It is still another object of the present invention to provide an anti-theft apparatus for motor vehicles for selectively and completely blocking or unblocking a motor vehicle fuel supply line.

Other objects and advantages of the present invention will be made apparent to those persons skilled in the art upon a review of the Description of the Preferred Embodiment taken in conjunction with the Drawings which follow.

BRIEF DESCRIPTION OF THE DRAWINGS

Figure 1:
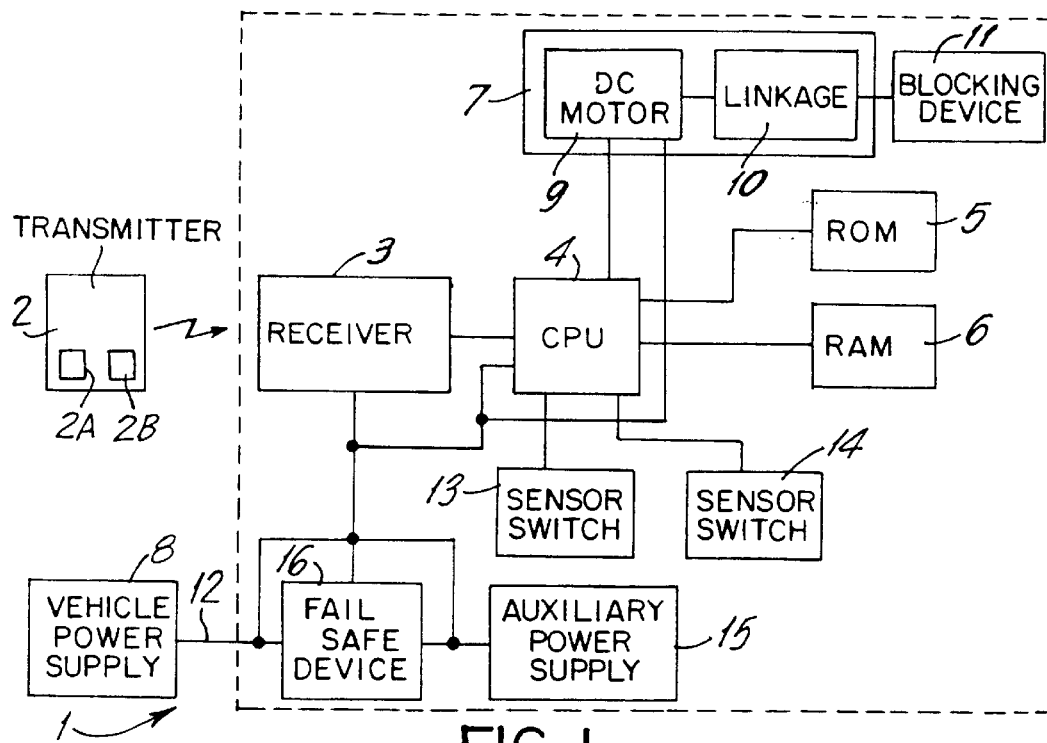
Figure 2A:
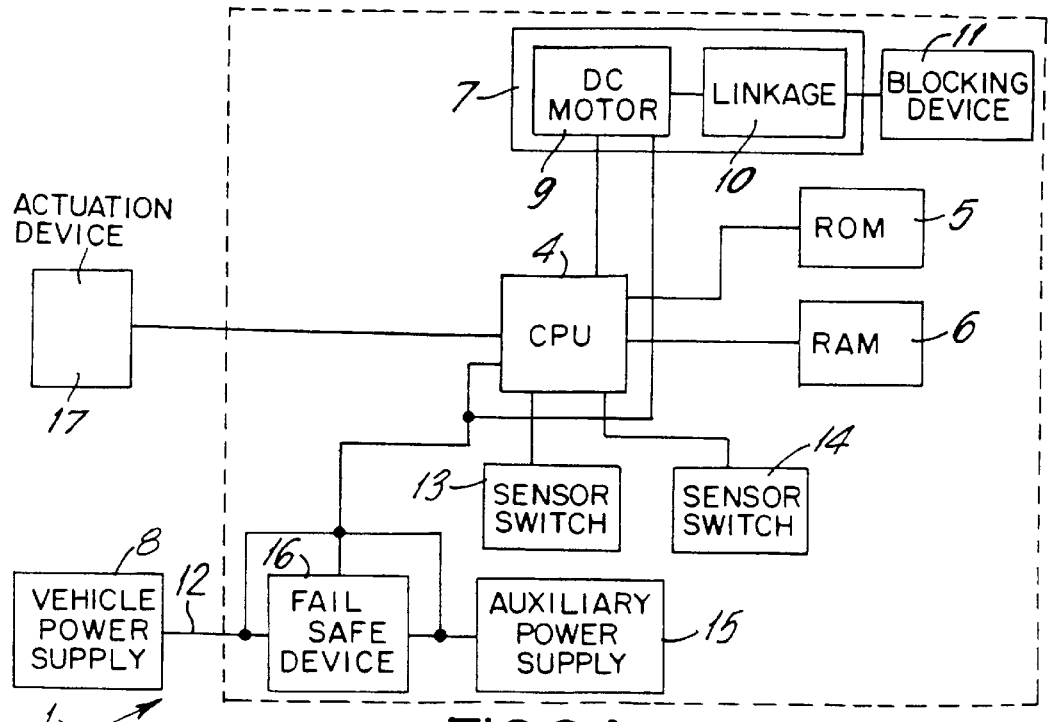
Figure 2B:
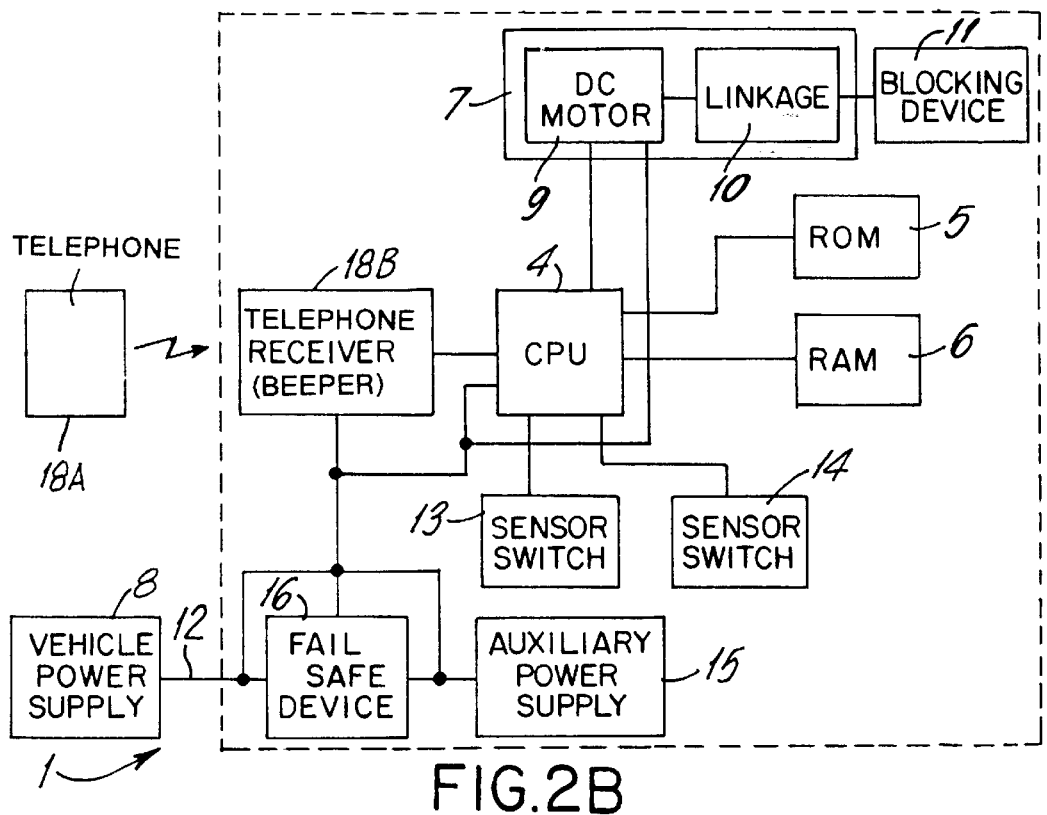
Figure 3:
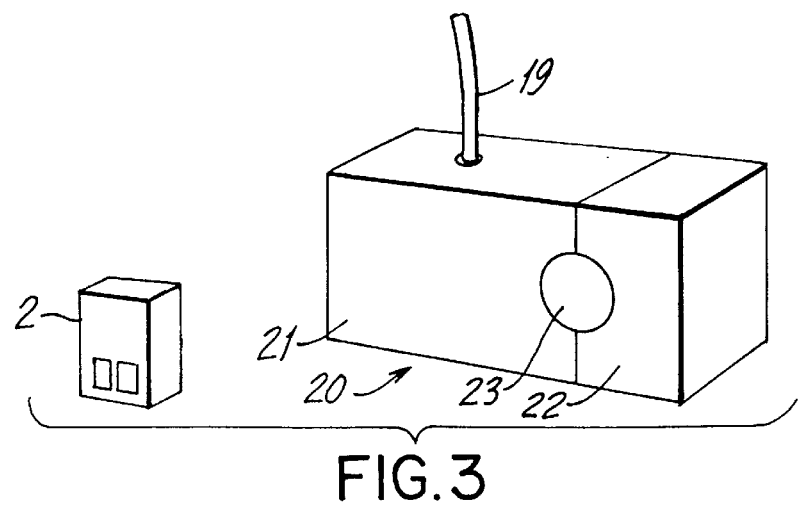
Figure 4:
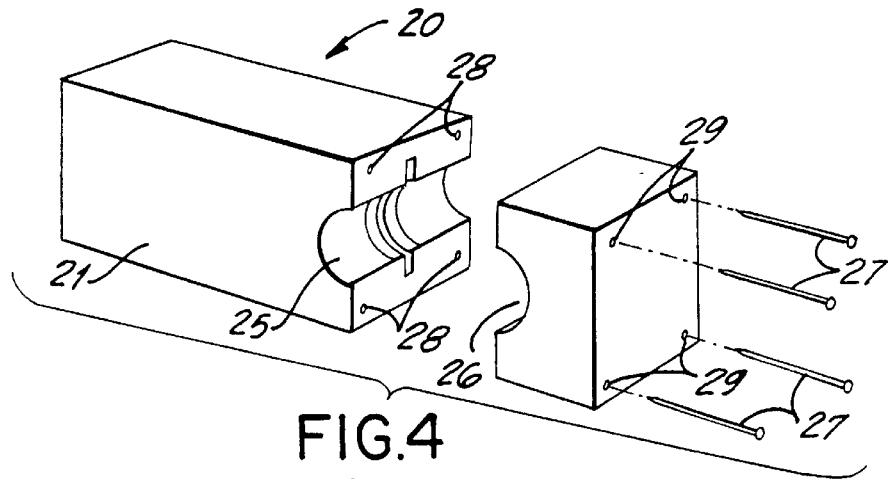
Figure 5:
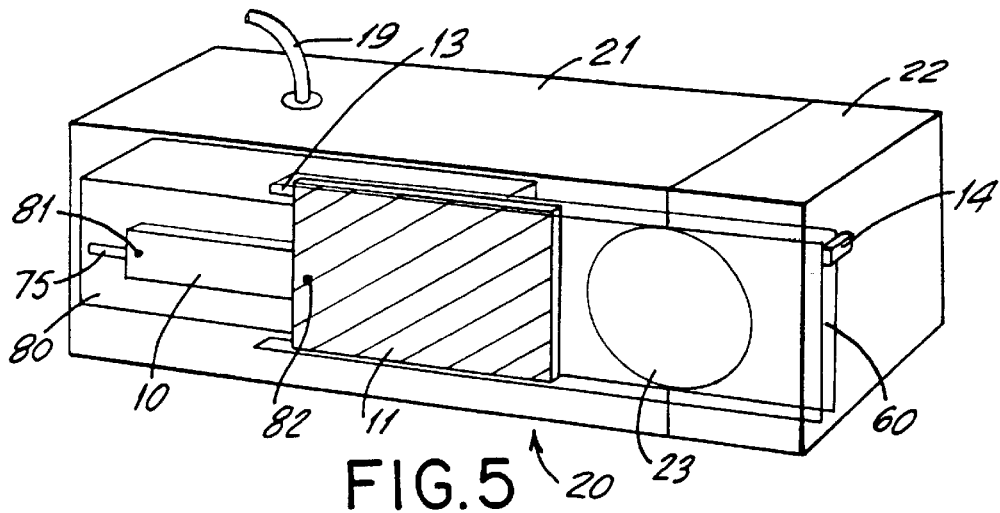
Figure 6A:
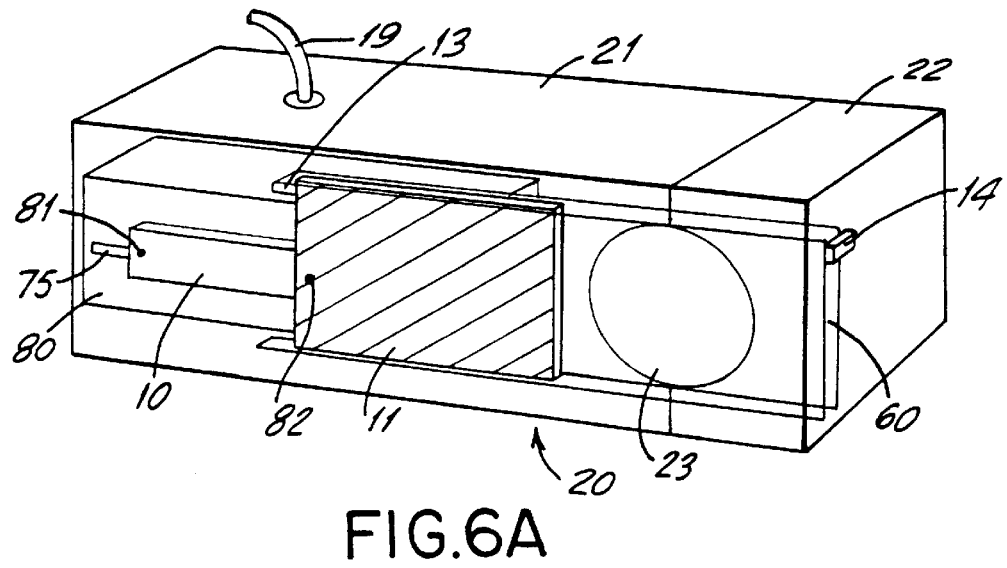
Figure 6B:
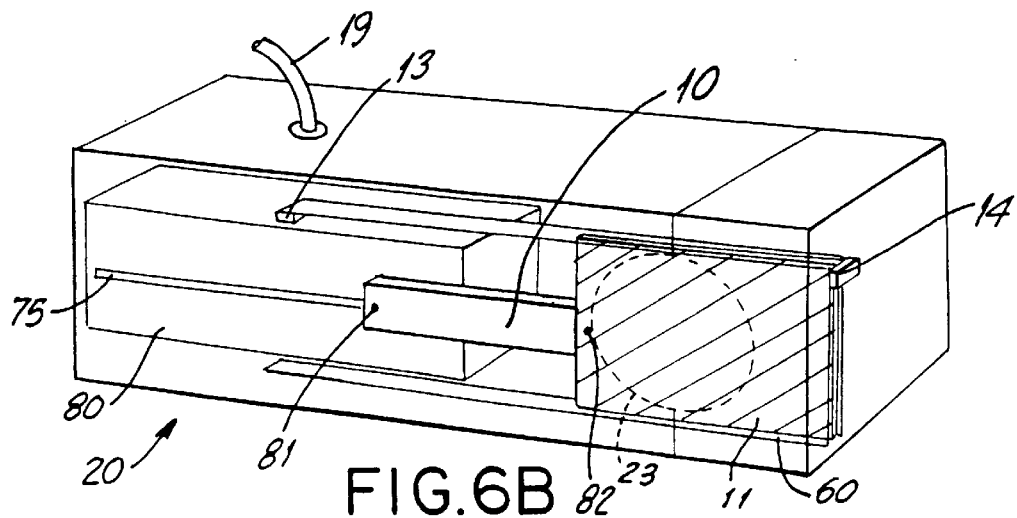
Figure 7A:
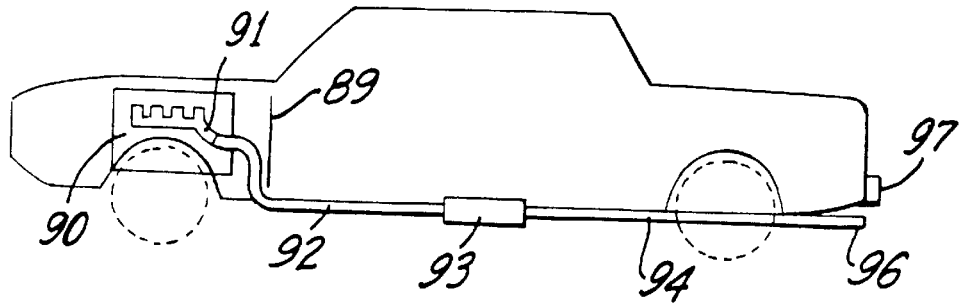
Figure 7B:
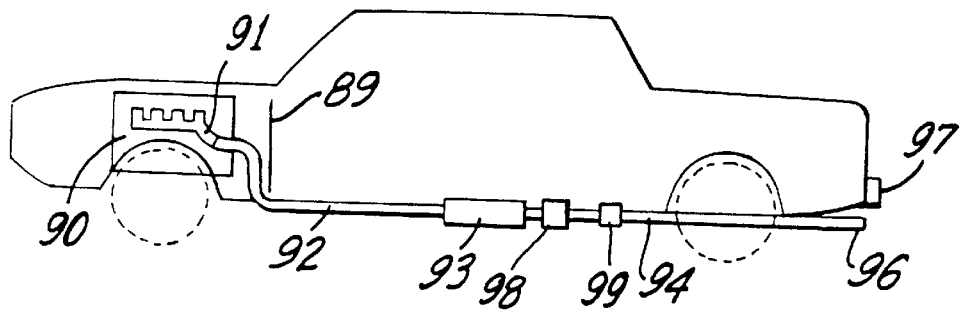
Figure 7C:
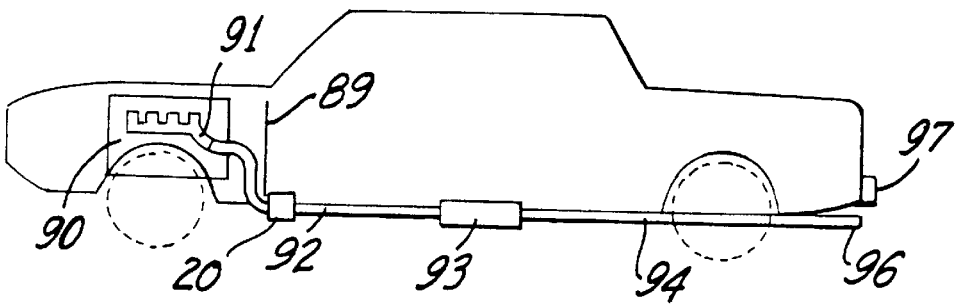
Figure 7D:
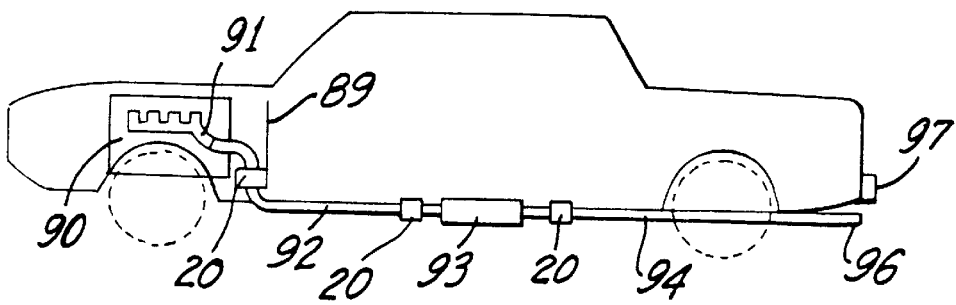
Figure 9A:
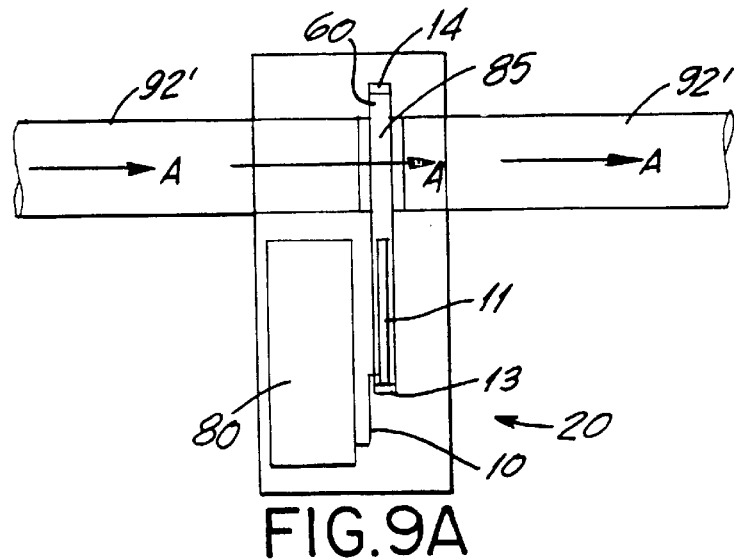
Figure 9B:
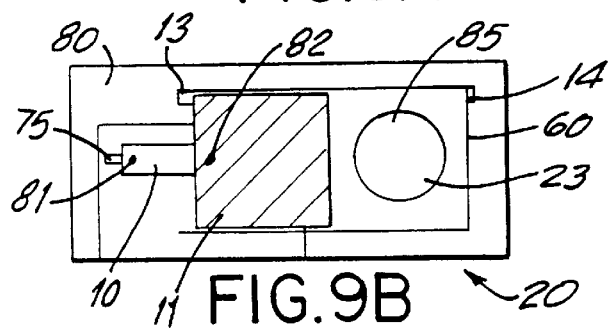
Figure 9C:
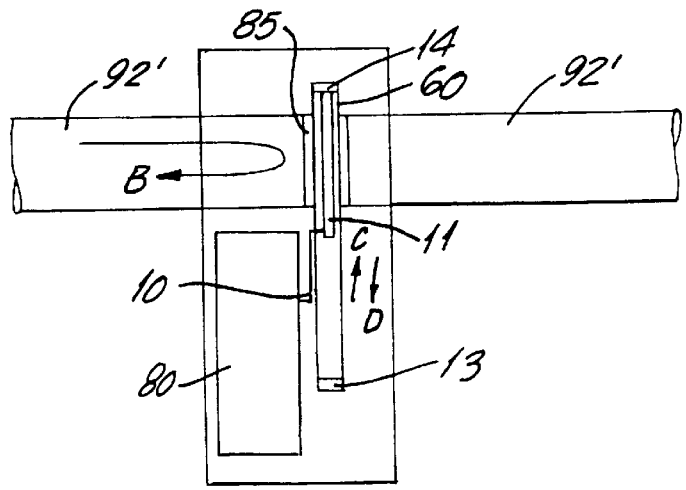
Figure 9D:
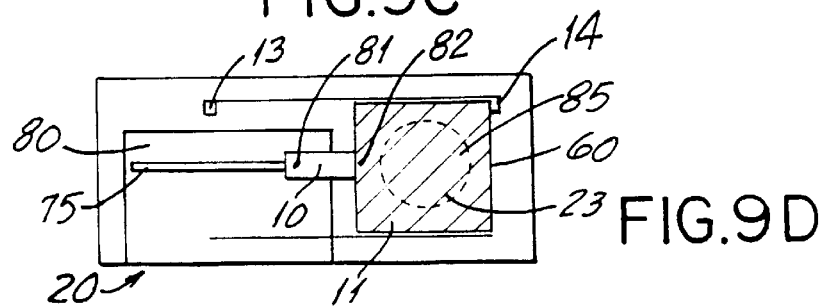
Figure 10A:
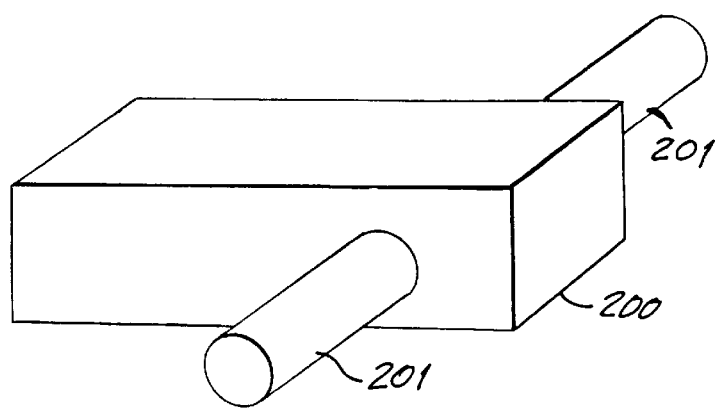
Figure 10B:
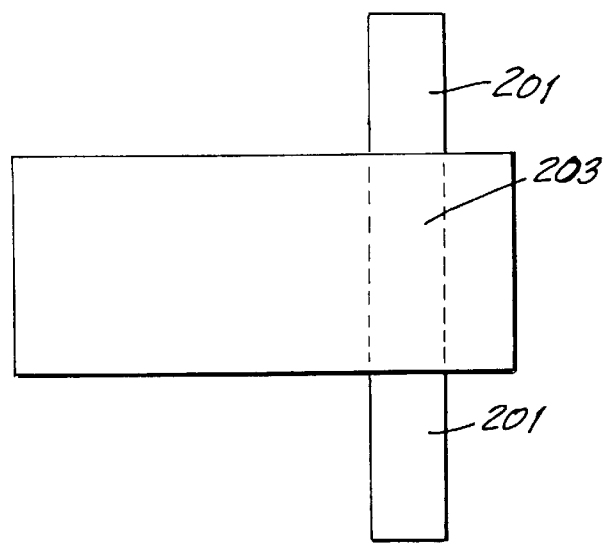
Figure 10C:
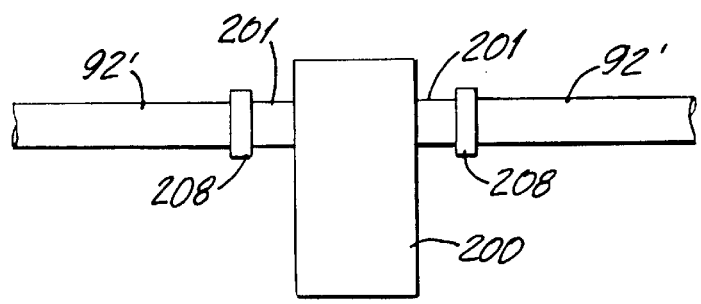
Figure 11A:
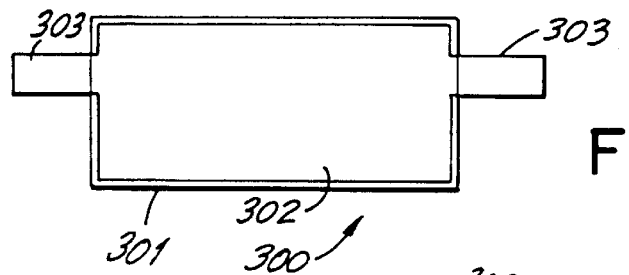
Figure 11B:
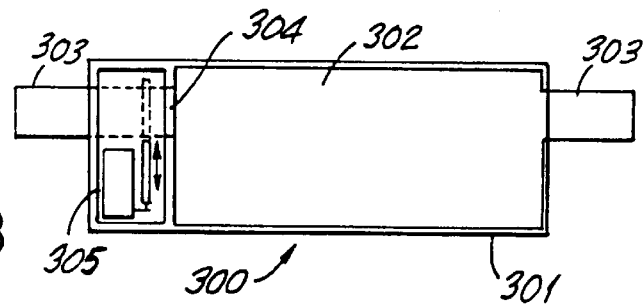
Figure 12A:
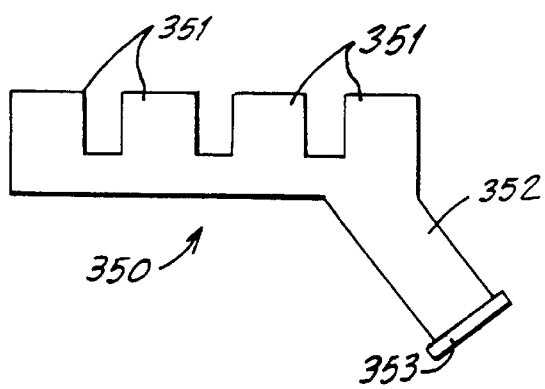
Figure 12B:
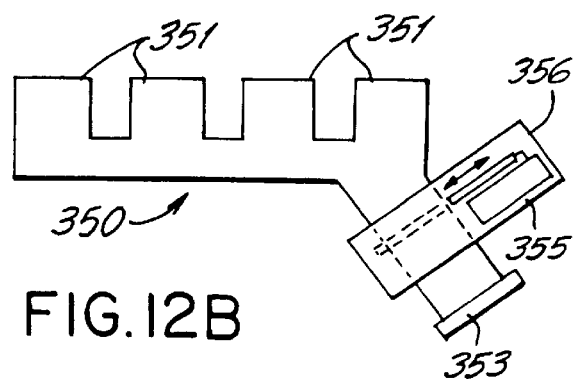
Figure 13:
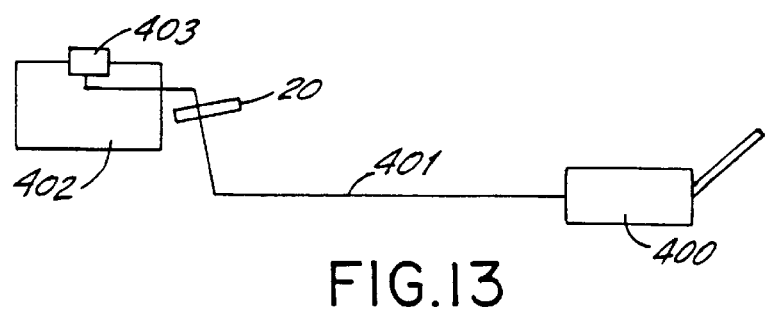

IN THE DRAWINGS:

FIG. 1 illustrates a block diagram of a preferred embodiment of the anti-theft apparatus of the present invention;

FIGS. 2A and 2B illustrate block diagrams of alternate preferred embodiments of the apparatus of the present invention;

FIG. 3 illustrates a perspective view of the main components of the apparatus of the present invention;

FIG. 4 illustrates an exploded perspective view of the housing of the preferred embodiment of the present invention;

FIGS. 4A–4F illustrate various views of the main components of the housing of the preferred embodiment illustrated in FIG. 4;

FIG. 5 illustrates a perspective view of the components housed within the housing of the preferred embodiment;

FIGS. 6A and 6B illustrate perspective views of the components housed within the housing of the preferred embodiment of the present invention in the "UNBLOCK" and in the "BLOCK" positions, respectively;

FIG. 7A illustrates a typical motor vehicle exhaust system;

FIG. 7B illustrates an alternate embodiment of a typical motor vehicle exhaust system;

FIG. 7C illustrates a typical motor vehicle exhaust system with a housing of the present invention installed therein;

FIG. 7D illustrates a typical motor vehicle exhaust system showing a plurality of possible locations for installation of the housing of the present invention therein;

FIGS. 8A–8D illustrate a preferred method for installing the housing of the present invention in a motor vehicle exhaust system;

FIGS. 9A and 9B illustrate top and side sectional views, respectively, of the components of the housing in the "UNBLOCK" position;

FIGS. 9C and 9D illustrate top and side sectional views, respectively, of the components of the housing in the "BLOCK" position;

FIGS. 10A and 10B illustrate perspective and top sectional views, respectively, of an alternate preferred embodiment of the housing of the apparatus of the present invention;

FIG. 10C illustrates the alternate preferred embodiment of FIGS. 10A and 10B installed in a motor vehicle exhaust system;

FIG. 11A illustrates a top sectional view of a typical motor vehicle muffler;

FIG. 11B illustrates an alternate embodiment of the present invention from a top sectional view wherein components of the present invention, which are housed in the housing, are integrally constructed within the muffler of FIG. 11A;

FIG. 12A illustrates a side sectional view of a typical motor vehicle exhaust manifold;

FIG. 12B illustrates an alternate embodiment of the present invention from a side sectional view wherein the components of the present invention, which are housed in the housing, are integrally constructed within the exhaust manifold of FIG. 12A; and FIG. 13 illustrates an alternate embodiment and use thereof of the present invention wherein the housing is installed in, and used in conjunction with, a motor vehicle fuel supply line.

DESCRIPTION OF THE PREFERRED EMBODIMENT

FIG. 1 illustrates, in block diagram form, the anti-theft and/or theft-deterrent apparatus or system (hereinafter "anti-theft apparatus" or "apparatus") which is the subject of the present invention and which is denoted by the reference numeral 1. With reference to FIG. 1, the anti-theft apparatus 1, in the preferred embodiment, comprises a remote transmitter 2 which, in the preferred embodiment, is a wireless or remote transmitter which is similar to those used in conjunction with vehicle alarm systems and/or vehicle keyless entry systems.

The remote transmitter 2 (hereinafter "transmitter"), in the preferred embodiment and as shown in FIG. 1, has two buttons or switches 2A and 2B located thereon for preforming at least two distinct system operations. In the preferred embodiment, the button 2A commands the "lock" or "block" operation, as will be described below, while the button 2B commands the "unlock" or "unblock" operation as will also be described below.

The transmitter 2, in the preferred embodiment, is powered by a suitable DC power supply or by a battery (not shown). It is also important to note that the transmitter 2 may also be solar-powered.

Referring once again to FIG. 1, the anti-theft apparatus 1 also comprises a receiver 3 which receives the signal(s) transmitted by the transmitter 2. The receiver 3 is connected to a CPU 4 which may be a microprocessor or any other suitable control device. In the preferred embodiment, the CPU 4 has associated therewith a read only memory device (ROM) 5 and a random access memory device (RAM) 6 for use in conjunction therewith. The CPU 4 serves to process the received signal(s) and provide control over the apparatus 1. The anti-theft apparatus 1 also comprises a blocking device moving means 7 which is electrically connected to the CPU 4, as shown in FIG. 1.

The blocking device moving means 7 is electrically connected to, and has its operation controllable by, the CPU 4. In FIG. 1, the blocking device moving means 7 further comprises a reversible DC electric motor 9 and a mechanical linkage 10. The receiver 3, the CPU 4, the ROM 5, the RAM 6 and the blocking device moving means 7, may be integrated, for the sake of convenience and/or simplicity, into a single unit or device, such as a housing as described below, located separate and apart from the transmitter 2. As shown in FIG. 1, the receiver 3, the CPU 4 and the blocking device moving means 7 (DC motor 9) are connected to a vehicle power supply 8 via supply line 12 and/or to any other suitable and/or associated circuitry which may be required for supplying power to each of the respective devices or components. Power can be supplied to the ROM 5, to the RAM 6 and/or to the circuitry for the sensor switches 13 and 14 (described below) from the circuitry of, or the circuitry supplying power to, the CPU 4 by any one or more of the widely known conventional electrical and/or electronic design techniques. The vehicle power supply 8 may typically be, and/or be supplied by, a motor vehicle battery. It should be noted that each of the apparatus components which requires power may receive power directly from suitable circuitry connected to, or supplied by the vehicle power supply 8, or via other components in the apparatus, using conventional techniques.

The apparatus 1 further comprises a blocking device 11 which is mechanically connected to the blocking device moving means 7 as described in more detail below. In the preferred embodiment, the linkage 10 is mechanically connected to the DC motor 9 and also to the blocking device 11. In the preferred embodiment, the reversible DC electric motor 9 and the linkage 10 provide the means by which the blocking device 11 can be moved and/or displaced in either one of two directions, as will be described below. In this regard, the blocking device 11 is mechanically linked to the DC motor 9 via the linkage 10.

The apparatus 1 of FIG. 1 also comprises, in the preferred embodiment, blocking device position sensor switches 13 and 14 which are connected to the CPU 4. As will be described below, the sensor switches 13 and 14 serve to sense when the blocking device 11 is moved or displaced to a respective pre-defined position, at which time, the CPU 4 will shut off the DC motor 9. In this manner, the position sensor switches 13 and 14 serve to prevent damage to the DC motor 9 and/or to other components of the apparatus as well as to prevent power drainage. In the preferred embodiment, the position sensor switches 13 and 14 are micro-switches.

The apparatus 1 of FIG. 1 also comprises, in the preferred embodiment, an auxiliary power supply 15, which is capable of providing auxiliary power to each of the apparatus components which are supplied by the vehicle power supply 8. In the preferred embodiment, the auxiliary power supply 15, which may include individual power supplies or sources for powering the respective system components, provides electrical power to the respective components if the vehicle power supply 8 should be disconnected or interrupted, such as when a vehicle battery is stolen or if the supply line 12 is disconnected or damaged. In the preferred embodiment, the auxiliary power supply 15 is comprised of typical batteries which may or may not be rechargeable or solar-powered. The auxiliary power supply batteries or devices may also be continuously chargeable by the vehicle power supply 8 during vehicle operation so as to keep them readily charged for use should vehicle power be disconnected or interrupted. It should be noted that other alternate power supplies or sources may also be used to supply power to the components of the apparatus 1.

In the preferred embodiment, the apparatus 1 also comprises a fail-safe device 16 which is used in conjunction with, and which is powered by, the auxiliary power supply 15. The fail-safe device 16 is also connected to the vehicle power supply 8 and serves to sense if the vehicle power supply 8 is disconnected or interrupted. In this regard, the fail safe device 16 may utilize an electrical relay system. When and if such a condition should occur, the fail-safe device 16 serves to activate and/or to switch the circuitry of the components which require power to the auxiliary power supply 15.

As noted above, the DC motor 9 provides control over the physical movement and/or the displacement of the blocking device 11. The DC motor 9 is a reversible DC motor so that the blocking device 11 may be moved or displaced in opposite directions to and between predefined extreme positions as will be described below. The linkage 10 facilitates the movement or the displacement of the blocking device 11 in conjunction with the DC motor 9.

The blocking device 11, in the preferred embodiment, is utilized to be placed directly into, and serves to completely block off, or seal off, the motor vehicle exhaust system, exhaust pipe or exhaust line (hereinafter "exhaust system"), thereby preventing the release of engine exhaust gases into the atmosphere. The blocking device moving means 7 serves, via the DC motor 9 and the linkage 10, to physically move or displace the blocking device 11 during operation, as will be described below.

It is important to note that the transmitter 2/receiver 3 combination utilized may be chosen from any one of the widely known wireless transmitter/receiver systems with the only requirement being that they be compatible with one another and that they be sufficiently powered by any suitable electrical power source or supply. The transmitter 2/receiver 3 combination may also be replaced by a simple series electrical circuit having a suitable activation or actuation means so that the apparatus 1 may be activated by a switch, by a key, or by any suitable means such as by a keypad, a card reader, an optical reader, or a keyless activation system.

It is important to note that the transmitter 2/receiver 3 combination of FIG. 1 may easily be replaced with a simple series electrical circuit configuration as shown in FIG. 2A. FIG. 2A illustrates a block diagram of an alternate preferred embodiment of the present invention which utilizes an actuation device 17 which may be operated via a switch, a key, a keypad, proximity cards and associated card readers, bar code cards and associated card readers and magnetic stripe cards and associated card readers. It is also possible to utilize swipes cards/readers, turnstile cards/readers, insertion cards/readers and key/key insertion reader systems.

FIG. 2B illustrates a block diagram of another alternate preferred embodiment of the apparatus 1 which utilizes a telephone 18A and an associated receiver or telephone beeper 18B. It is important to note that, since lack of access is a major concern in vehicle anti-theft systems, a wireless or a keyless actuation means or transmitter/receiver configuration is preferred.

FIG. 3 illustrates the anti-theft apparatus 1 of FIG. 1 in a perspective view. In FIG. 3 the apparatus 1 is comprised of the transmitter 2 and the housing 20. The apparatus 1 of FIG. 3 also comprises an electrical line cord 19 for supplying power from the vehicle power supply 8, or other power supply, to the components located in the housing 20. The housing 20 is further comprised of two main components 21 and 22 as shown in FIG. 3. A cutout or passageway 23 is formed in the housing 20. The cutout or passageway 23, as will be described below, facilitates the connection and/or the installation, of the housing 20 into the vehicle's exhaust system. The housing 20 of the apparatus 1 is designed to be installed in the vehicle exhaust system.

FIG. 4 illustrates the components of the housing 20. The housing components 21 and 22, in the preferred embodiment, are shaped as shown in FIG. 4 with curved cutout sections 25 and 26, respectively, so that, when the components 21 and 22 are connected together, they form the cutout or passageway 23 which extends through the housing 20 and which will be utilized as described below.

The components 21 and 22 may be connected together via threaded bolts 27 which are inserted into correspondingly threaded bores 28 and 29 of components 21 and 22, respectively. The bores 28 and 29 should be bored into solid members of their respective housing components 21 and 22. While any suitable threaded bolts may be utilized, it is preferred to utilize bolts which have a security head (i.e. specially shaped heads which require correspondingly-shaped tools or devices for use therewith) which require a special key or mating plug or device for their insertion and/or removal. FIG. 3 illustrates the housing 20, after the components 21 and 22 are connected and secured together via the bolts 27.

Referring, once again to FIG. 4, and as noted above, the housing 20 houses many of the essential components of the anti-theft apparatus 1. The transmitter 2 is located external from the housing 20 and, as noted above, is wireless in the preferred embodiment thereby dispensing with the need for an electrical connection between the transmitter 2 and the components located in the housing 20. In this manner, no switching device on or in the motor vehicle is needed for activating or actuating the apparatus 1, thereby facilitating greater security. It is also important to note that, if an actuation device is utilized, such as in the alternate embodiment of FIG. 2A, an electrical connection between the actuation device and the housing 20 must be provided.

Figure 4A:
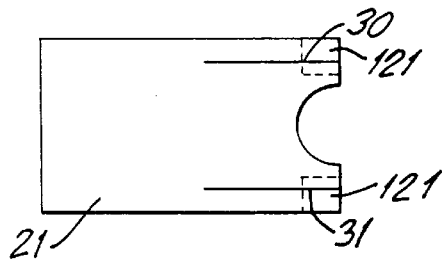
Figure 4B:
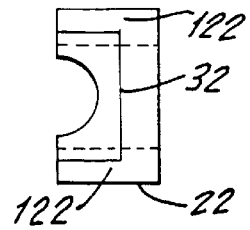

FIGS. 4A and 4B illustrate side sectional views of the housing components 21 and 22, respectively. In FIG. 4A, housing component 21 has guide track components 30, 31 located therein as shown. In FIG. 4B, housing component 22 has guide track component 32 located therein as shown. The guide track components 30, 31 and 32 of the housing components 21 and 22, respectively, must be alignable with one another so that a continuous, and an aligned, guide track can be formed when the housing components 21 and 22 are connected together as will be described below. As will be described below, the guide track will serve to support and guide the blocking device 11 during apparatus operation.

The housing component 21 of FIG. 4A also comprises solid block elements 122 (shown in dotted lines) which are formed into each of the four corners of the housing component 21 and into which the threaded bores 28 are formed. Similarly, the housing component 22 of FIG. 4B also comprises solid block elements 122 (shown in dotted lines) which are formed into each of the four corners of the housing component 22 and into which the threaded bores 29 are formed.

It should be noted that the housing components 21 and 22, in the preferred embodiment, are constructed of a metal material which is typically steel, stainless steel or any other suitable metal. It is also possible to construct and/or to form the housing components 21 and 22 from any other suitable non-steel material such as a hard rubber, a plastic or a suitable composite material.

Figure 4C:
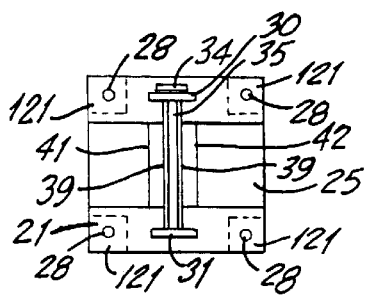
Figure 4D:
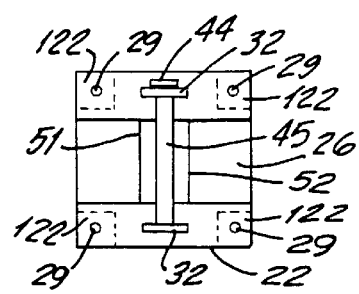

FIGS. 4C and 4D illustrate front views of the components 21 and 22, respectively. In FIG. 4C, the housing component 21 has located, on and along the curved cutout section 25, stop elements 41 and 42, which are formed thereon and which, as will be described below, serve to provide a means for sealing off the cutout or passageway 23 when the housing 20 of the apparatus 1 is installed in the motor vehicle exhaust system. FIG. 4C also illustrates the guide track components 30, 31 and the threaded bores 28 along with solid elements 121. Housing component 21 also has an electrical connection access hole 34 for facilitating the necessary electrical connections which must be made between the apparatus components housed in the housing components 21 and 22 as will be described below. Also shown in FIG. 4C is a rectangular slot 35, which extends from the top guide track element 30 to the bottom guide track element 31. The blocking device 11 is moveable, and retractable, through the slot 35.

Located adjacent the slot 35 are flexible rubber seals 39 which serve to seal off the slot 35 and any space between the slot 35 and the blocking device 11 so as to prevent gases, gas particles and/or contaminants from flowing from the exhaust system into the housing 20. The rubber seals 39, in the preferred embodiment, are of the type used on vehicle windows which serve to press against or maintain a bias force against the blocking device 11 as it is moved, or displaced, through the slot 35. Further, when the blocking device 11 is removed entirely from the slot 35, or retracted back into the housing component 21, the rubber seals 39 serve to block off or seal-off the slot 35 so as to prevent the entry of exhaust gases and/or other foreign matter into housing component 21.

In FIG. 4D, the housing component 22 has located, on and along the curved cutout section 26, stop elements 51 and 52 which are formed thereon which, as will be described below, serve to provide a means for sealing off the cutout or passageway 23 when the housing 20 of the apparatus 1 is installed in the motor vehicle exhaust system. FIG. 4D also illustrates the guide track component 32 and the bores 29. Housing component 22 also has an electrical connection access hole 44 for facilitating the necessary electrical connections between the apparatus components which are made in conjunction with the use of access hole 34. Also shown in FIG. 4D is a slot 45 in housing component 22 which corresponds to slot 35 and into which the blocking device 11 is moved or displaced during operation.

Figure 4E:
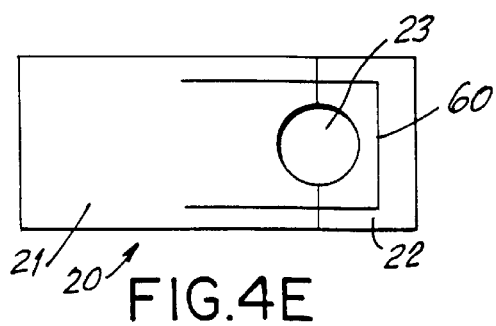

FIG. 4E illustrates a side sectional view of the housing components 21 and 22 after they are connected together. As shown, the guide track components 30, 31 and 32 form the guide track 60 in which guide track 60 the blocking device 11 will be moveable and supportably guided therewithin. It is important to note that the guide track components 30, 31 and 32 must be aligned with each other so as to provide for a continuous and an aligned guide track 60 which will be utilized to serve as a guide track and support for the blocking device 11 as is described below. The guide track 60 may also have seals (not shown) associated therewith which serve to further seal off the flow of exhaust gases when the blocking device 11 is in the guide track 60 in the "BLOCK" position as described below. In this regard, the seals should be located to seal off any areas where the blocking device 11 and guide track 60 are adjacent to one another.

Figure 4F:
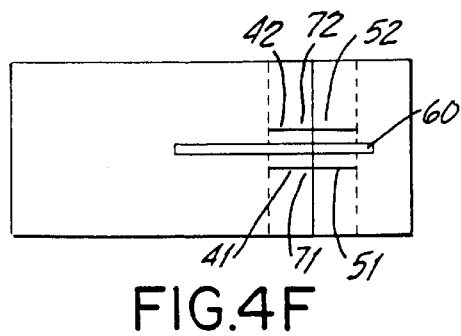

FIG. 4F illustrates a top sectional view of the housing components 21 and 22 once the housing 20 is assembled. As shown in FIG. 4F, the stop element 41 of component 21 and the stop element 51 of component 22 form a stop washer 71 within the cutout 23. In a similar manner, the stop element 42 of component 21 and the stop element 52 of component 22 form a stop washer 72. It is important to note that the stop washers 71 and 72 are located away from, and do not interfere with, the guide track 60 which guide track 60 defines the path of movement of the blocking device 11. Stop washers 71 and 72, serve as stopping elements or rests for the exhaust pipe sections (not shown) which will be placed in the housing 20 during installation of the housing 20 in the exhaust system of the motor vehicle, as will also be described in more detail below.

The stop washers 71 and 72 also serve to prevent leakage of vehicle exhaust gases through the cutout or passageway 23 and, therefore, through the housing 20, so as to further block off or seal off the exhaust system. The stop washers 71 and 72, and their components, should be of such a size and shape, that they present no, or only a negligible, effect on the flow of exhaust gases through the housing 20 and, therefore, through the exhaust system. It is preferred that the stop elements 41, 42 and 51, 52 be no thicker than the thickness of the exhaust system component or pipe section which the housing 20 will be utilized in conjunction with.

The cutout or passageway 23, which is formed once the housing components 21 and 22 are connected together, should have a diameter which facilitates the insertion thereinto, or which facilitates the placement of the housing 20 in and/or about, the desired portions or components of the motor vehicle exhaust system. Therefore, the cutout 23 should, for example, be large enough so that a vehicle's exhaust pipe sections can be inserted thereinto during use, yet be small enough so that the exhaust system can be maintained in a sealed state when desired.

FIG. 5 illustrates a perspective view of the assembled housing 20 illustrating the components of the anti-theft apparatus 1 which are housed therein. In the preferred embodiment of FIG. 5, an internal or interior housing 80 houses the various component devices of the apparatus 1, shown in FIG. 1, with the exception of the linkage 10, the blocking device 11 and the sensor switches 13 and 14. In FIG. 5, the DC Motor 9, which may be housed in interior housing 80, along with any combination of the other above-described apparatus components, is mechanically linked to the blocking device 11 via mechanical linkage 10.

In the preferred embodiment, the blocking device 11 is a rectangular plate which should be thick enough and which should be constructed of a suitable material, so that it can withstand the stresses and forces present in a vehicle's exhaust system. It is important to note that any size or shape plate may be chosen provided that the plate may fit securely into, and slide within, and along, the guide track 60 and the slot elements 35 and 45 of the components 21 and 22, respectively. It is also possible to utilize a blocking device 11 which is of a non-rectangular shape and which may be of a non-uniform thickness, such as a piston, etc., as long as a corresponding guide track is utilized therewith.

The blocking device 11 is to be chosen so that, when it is in a "block" position, as described below, it completely blocks off, or seals off, the vehicle's exhaust system when the housing 20 portion of the apparatus 1 is installed in the motor vehicle exhaust system. While the blocking device 11 may be composed of any suitable material, in the preferred embodiment, it is made from stainless steel so as to resist corrosion or so as to otherwise resist the effects of the vehicle's exhaust gases and its component elements. The blocking device 11 may also be made from a brass, a steel, an aluminum, a hard plastic, or a suitable composite material or from any other suitable material.

With reference once again to FIG. 5, the linkage 10, is connected to the DC motor 9 of the blocking device moving means 7 via connector 81 which may be comprised of a simple bolt/nut combination. The linkage 10, in turn, is connected to the blocking device 11 via connector 82 which may also be comprised of a simple bolt/nut combination. The linkage 10 is moveable along a track 75 which is formed on, and in, the interior housing 80. The manner in which the DC motor 9 serves to move or displace the linkage 10 so as to move or displace the blocking device 11 may be by any one of the well known methods or techniques used to mechanically activate and/or to physically move or displace a device with a DC motor via a mechanical linkage. In the preferred embodiment, a simple linkage bar 10, with the associated connectors 81 and 82, is utilized so as to move or displace the blocking device 11 via the DC motor 9. The above components and, in particular, the track 75 should be adequately protected by suitable protective covering and/or sealing means so as to protect the components housed in the housing 80 from particles and contaminants which may be present in the exhaust gases.

It is also important to note that a motor vehicle power window type system, or its equivalent, which provides a mechanism for providing movement and/or displacement along a defined guide track, may also be utilized in order to move or displace the blocking device 11 with the reversible DC motor 9.

It is also important to note that other suitable electrical, mechanical, or electro-mechanical systems, including hydraulic and/or pneumatic devices or systems and/or vacuum systems, may be utilized in order to move or displace the blocking device 11. Such alternative systems may be controlled by simple electrical circuits, or, in the case of hydraulic and/or pneumatic systems, may be mechanically activated or may be activated by vacuum-type devices.

Alternative actuating devices may also be located inside the passenger compartment of the vehicle. A cam-type mechanical linkage may also be utilized. As noted above, in the preferred embodiment, the reversible DC motor 9 is powered by the motor vehicle's battery 8 via supply cord 19, via supply line 12, which should be protected by a protective and/or concealed harness or casing and should be concealed. The supply cord 19 should also be located in such a manner so as to prevent access thereto so as to prevent it from being destroyed or vandalized.

In FIG. 5, the blocking device 11 is positioned within, and movable along and within, the guide track 60. The guide track 60 should extend lengthwise within the housing 20 so that the blocking device 11 may be guided between two extreme positions of use which are defined below. The blocking device 11 should, at all times and in all positions, be retained within and supported by the guide track 60 so as to prevent its unwanted displacement within the housing 20. In the preferred embodiment, the guide track 60 should be lubricated with any suitable lubricant (i.e. silicon, graphite, oil, grease, or the like, etc.) or with any other suitable lubricant so as to facilitate a trouble-free sliding back and forth of the blocking device 11 within and along the guide track 60. Seals (not shown) should also be utilized so as to facilitate an air tight seal between the blocking device 11 and the guide track 60 once the blocking device 11 is secured in the guide track 60.

The apparatus 1, as noted above, also comprises sensor switches 13 and 14, which are employed to sense when the blocking device 11 is moved to, or displaced to, each of the pre-defined extreme positions. In one extreme position, the blocking device 11 is completely outside of the exhaust system, path or line. This extreme "UNBLOCK" position is defined as the "UNBLOCK" or "OPEN" position and is also defined as "POSITION I". FIG. 6A illustrates the blocking device 11 in the "UNBLOCK" position. In the other extreme position, the blocking device 11 is directly in, and completely blocks, and seals off, the exhaust system. This extreme "BLOCK" position is defined as the "BLOCK" or "CLOSED" position and is also defined as "POSITION II". FIG. 6B illustrates the blocking device 11 in the "BLOCK" position.

The sensor switches 13 and 14 are utilized by, and may be considered to be components of the blocking device moving means 7, so as to sense when the blocking device 11 reaches and is in the "UNBLOCK" position or in the "BLOCK" position, respectively.

In the preferred embodiment, the sensor switches 13 and 14 are micro-switches which are electrically connected to the CPU 4. Sensor switch 13 is physically located, as illustrated in FIG. 5, at the end portion of the guide track component 60 in housing component 21 and sensor switch 14 is physically located at the end portion of the guide track 60 in housing component 22. Sensor switch 14 can be electrically connected to the CPU 4 and/or other electrical circuits via connection holes 34 and 44 in the housing components 21 and 22, respectively.

The sensor switch 13 serves to sense when the blocking device 11 has reached the "UNBLOCK" position while sensor switch 14 serves to sense when the blocking device 11 reaches the "BLOCK" position. When sensor switch 13 senses that the blocking device 11 has reached the "UNBLOCK" position, the CPU 4 will shut off the DC motor 9. Similarly, when sensor switch 14 senses when the blocking device 11 has reached the "BLOCK" position, the CPU 4 will shut off the DC motor 9. In each instance, the CPU 4 will then reset the sensor switch which had been previously actuated so that it will be reset for future operation.

In the preferred embodiment, the sensor switches 13 and 14 are activated by being contacted, triggered or depressed, by or at least by a portion of, the blocking device 11. The sensor switches then serve to cause the CPU 4 to shut off the power to the DC motor 9 of the blocking device moving means 7 so as to conserve power, to prevent damage to the DC motor 9 and to reset the DC motor 9 for its next operating condition. When the blocking device 11 is actuated and is moved to the opposite extreme position, the opposite sensor switch will be actuated and will once again serve to shut off power to the DC motor 9. In addition, the CPU 4, as noted above, will reset the previously actuated sensor switch so that it will be ready for future operation. In this manner, the sensor switch which was previously actuated will be in condition to be actuated upon the next movement of the blocking device 11 into contact therewith. Other known techniques or devices may also be employed in order to shut off the DC motor 9 in each of its reversible modes of operation when the blocking device 11 has reached each of the respective extreme positions.

The anti-theft apparatus 1 of the present invention operates so as to selectively block and unblock the motor vehicle exhaust system so as to prevent the release of engine exhaust gases into the atmosphere. With engine exhaust gas release prevented, or severely hampered, the motor vehicle combustion engine will be rendered inoperable, or its operation will be severely curtailed, respectively, as is the case with any gasoline-combustion or diesel fuel-combustion engine which requires oxygen in order to operate. The failure or the inability to release, or to properly dispose of, engine exhaust gases into the atmosphere creates back pressure(s) in the exhaust system which prevents, or severely curtails the flow of air, and therefore, the flow of oxygen, into the vehicle engine's combustion chambers (not shown). In this regard, the vehicle engine will be rendered inoperable, or have its operation severely curtailed in the total absence of, or a drastically reduced supply of, oxygen, respectively, which is a necessary component to engine operation.

By cutting off, or by eliminating, or by otherwise preventing or inhibiting the flow of air, and oxygen into the engine, the motor vehicle engine would either fail to start or cease to operate shortly after starting. Of course, in the case of an exhaust system which may contain leaks or which may be in a state of disrepair, thereby allowing some exhaust gases to be released, the engine and the vehicle may still continue to operate, but at a greatly reduced power level which may result in reduced vehicle speed which may serve to thwart and/or to severely hamper a theft of the motor vehicle. In this regard, the apparatus 1 of the present invention may be utilized in the motor vehicle exhaust system, exhaust pipe, or exhaust line so as to serve as an anti-theft and/or as a theft-deterrent system or device for the motor vehicle.

As described above, and with reference to FIGS. 6A and 6B, the blocking device 11 is movable between two extreme positions, namely, POSITION I and POSITION II. In FIG. 6A, the blocking device 11 is shown in the pre-defined first extreme position, which is defined as the "UNBLOCK" position or "POSITION I". In the "UNBLOCK" position (POSITION I), the blocking device 11 is totally removed from, or located outside of, the cutout or passageway 23 which cutout or passageway 23 serves to define a section of the engine's exhaust system at that location. In this position, the blocking device 11 is completely removed from the exhaust system. When and if desired, the blocking device 11 can be moved, or displaced, via the blocking device moving means 7, along the guide track 60, until it reaches and/or is located at the predefined second extreme position, which is defined as the "BLOCK" position or "POSITION II". FIG. 6B illustrates the blocking device 11 in the "BLOCK" position, or POSITION II.

In FIG. 6B, the blocking device 11 is located directly in, and completely blocks off and/or seals off, the cutout or passageway 23 thereby completely blocking off, or sealing off, the exhaust system of the motor vehicle, thereby preventing the release of exhaust gases into the atmosphere, and thereby preventing the flow of oxygen into the engine. In FIG. 6B, with the blocking device 11 located in the "BLOCK" position or POSITION II, the flow of exhaust gases through the housing 20 is completely blocked. It should be noted that the blocking device 11 is supported within the guide track 60 and slots 35 and 45 so as to completely seal off the cutout or passageway 23 and, therefore, the exhaust system. As noted above, additional seals (not shown) may also be utilized to effect an enhanced seal in these areas.

When and if it is desired to unblock or unseal the cutout or passageway 23, and therefore, the exhaust system, so as to return to normal exhaust system and engine operation, the blocking device 11 is once again moved or displaced, via the blocking device moving means 7, back to the "UNBLOCK" position or POSITION I, as shown in FIG. 6A.

The anti-theft apparatus 1 of the present invention may be utilized in conjunction with a motor vehicle's exhaust system in the following manner. FIG. 7A illustrates a typical motor vehicle engine and exhaust system configuration. In FIG. 7A, the basic components of the motor vehicle's exhaust system are illustrated and include the exhaust manifold 91 which is connected directly to the vehicle engine 90 and which serves to channel exhaust gases away from the engine when the exhaust gases are forced out of the engine's combustion chambers during the engine's exhaust operations. The exhaust manifold 91 is also connected to exhaust pipe 92.

A muffler 93 is connected to the exhaust pipe 92 as shown in FIG. 7A. A rear exhaust pipe 94 is, in turn, connected to the muffler 93. The rear exhaust pipe 94 runs the remainder of the length of the vehicle and terminates in the tail pipe section 96 at the rear end of the motor vehicle which is typically located in the area adjacent and/or below the rear bumper 97. It is important to note that the motor vehicle exhaust system may also comprise a catalytic converter 98 and a resonator 99, as shown in an alternate embodiment in FIG. 7B. The vehicle exhaust system may also be comprised of any other suitable auxiliary and/or supplemental exhaust system device(s).

The anti-theft apparatus housing 20 of the present. invention may be installed in the motor vehicle's exhaust system by being inserted into the exhaust system at any suitable location. In a preferred embodiment, the housing 20 is installed in the exhaust system, as shown in FIG. 7C. In FIG. 7C, the anti-theft apparatus housing 20 is installed in the exhaust pipe 92 at a location near, or adjacent to, the motor vehicle fire wall 89 as shown. The housing 20 may be mounted or secured to the motor vehicle, or to a component thereof, by any appropriate mounting device(s) which may include mounting brackets, or straps or other suitable devices and associated hardware.

By placing the housing 20 in an out-of-the way location, where it is not easily or readily accessible, the housing 20 will not be easily defeatable by a would-be car thief. While shown as installed in FIG. 7C, the housing 20 may also be installed at any suitable location along, or in, the exhaust system. FIG. 7D illustrates the motor vehicle exhaust system of FIG. 7A with the housing 20 of the present invention shown installed at various locations.

Figure 8A:
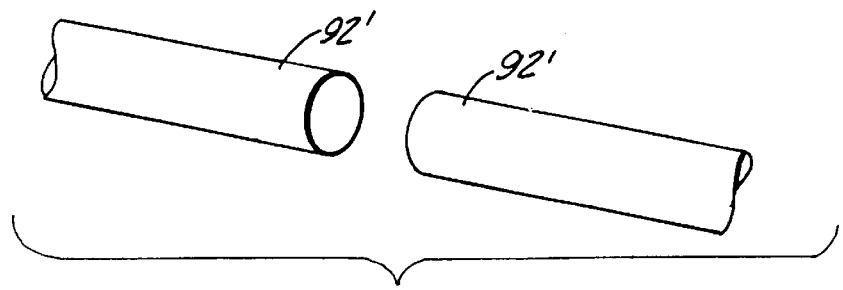
Figure 8B:
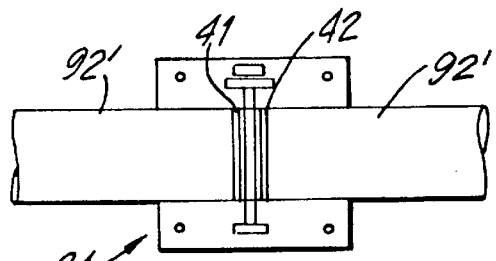

The housing 20 of the anti-theft apparatus 1 may be installed in the vehicle exhaust system in the following manner. FIGS. 8A–8D illustrate the sequence of steps which may be employed in installing the housing 20 in the exhaust system, and in particular, in a section of the exhaust pipe 92. With reference to FIG. 8A, the section of the exhaust pipe 92 is severed into two sections 92'. The housing component 21 should then be placed adjacent to the pipe sections 92'. The pipe sections 92' should then be placed in the cutout section 25 of housing component 21, as shown in FIG. 8B. Referring to FIG. 8B, it should be noted that each of the pipe sections 92' should be placed so that their respective ends are placed in contact with the stop element 41 or 42, which is nearest thereto as shown.

Figure 8C:
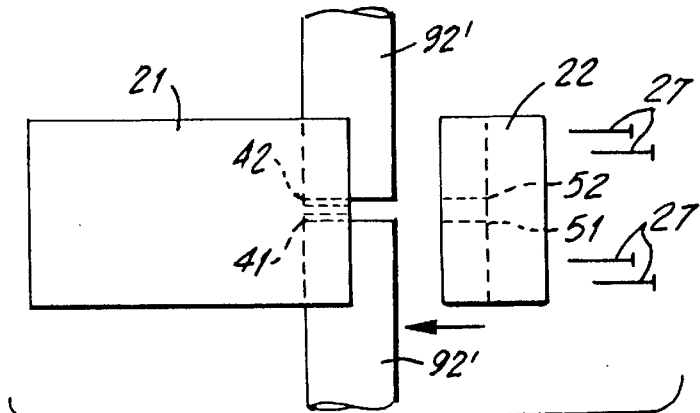

Once the exhaust pipe sections 92' are placed in the cutout section 25 of the housing component 21, the housing component 22 is then placed near, or adjacent to, the exposed sides of the pipe sections 92' as shown in the top view configuration of FIG. 8C. At this point, any electrical wiring connection between the housing components, 21 and 22, such as the electrical connection between the CPU 4 and the sensor switch 14 of housing component 22 should be made via the cutouts 34 and 44, respectively, of the components 21 and 22. Once all electrical connection(s) are made, the wiring should then be carefully placed into at least one of the housing components via the respective cutouts 34 or 44 so that the wiring will not be damaged by the ensuing connection together of the housing components 21 and 22.

The housing component 22 should then be carefully positioned about the exposed pipe sections 92' and the housing component 21 so that the pipe sections 92' are positioned within the cutout 26 of housing component 22, and further, so that each of the pipe sections 92' are placed in contact with or adjacent to the respective stop element 51 or 52 of housing component 22 which is nearest thereto. The respective bores 28 and 29 of the housing components 21 and 22, respectively, should also be properly aligned with one another. The housing components 21 and 22 can then be connected together with the threaded bolts 27 so as to result in the completely assembled housing 20 as shown in FIG. 8D which is installed about the pipe sections 92'.

As noted above, FIG. 8D illustrates a top sectional view of the assembled housing 20 which is installed about the pipe sections 92' of the exhaust pipe 92. It is important to note that care must be taken in placing the components 21 and 22 together so that the track guide elements 30, 31 of housing component 21 and the guide track element 32 of component 22 are properly aligned with each other so as to ensure that the guide track 60 is assembled in proper alignment. The track guide 60 and its components 30, 31 and 32 should be adequately lubricated with an appropriate lubricant such as silicon, graphite, oil or grease.

Figure 8D:
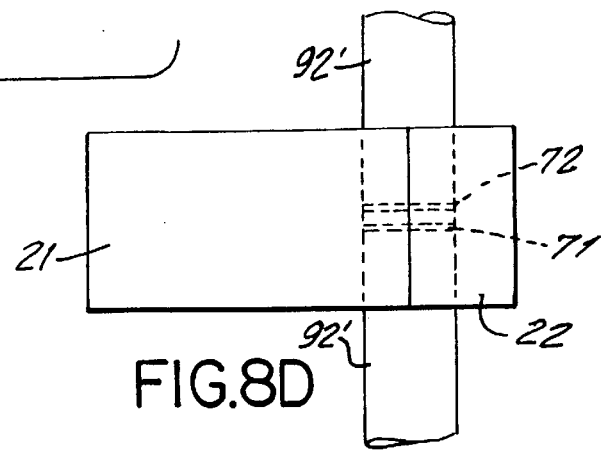

FIG. 8D further illustrates the stop washers 71 and 72, which are formed from the stop elements 41 and 51 and 42 and 52, respectively, which serve to seal off the cutout or passageway 23 so as to prevent exhaust gases from leaking or escaping therethrough and/or into, or through, the housing 20. In this manner, exhaust gas leakage may be minimized. Further, the stop washers 71 and 72 also serve to protect the guide track 60 and the blocking device 11 from being damaged due to inadvertent contact with the pipe sections 92' of the exhaust pipe 92. The components of the housing 20 should then be connected to the vehicle power supply 8 via electrical supply line 19 of FIG. 3.

In order to prevent undue stresses on the exhaust pipe 92, and further so as to provide security for the housing 20, the housing 20 should then be connected or mounted to the motor vehicle, or to a component thereof, such as by mounting brackets, straps, or other suitable mounting devices and associated hardware.

The housing 20 of the anti-theft apparatus 1 may also be easily installed, in a similar manner, at any other appropriate location in, or along, the exhaust system of the motor vehicle. As noted above, FIG. 7D illustrates alternate locations where the housing 20 may be installed along, or in, the vehicle exhaust system. As noted above, once installed, the housing 20 should preferably be attached or secured to the motor vehicle, or to a component thereof, such as by mounting brackets, straps or other mounting devices and associated hardware so that the housing 20 will be adequately supported in place and so as to protect the vehicle's exhaust system and/or its components from undue stresses. In the case of newly assembled motor vehicles, the housing 20 of the apparatus 1 may be easily installed at any appropriate location in the exhaust system during the vehicle's assembly process. In this manner, further concealment from a would-be car thief may be achieved.

In another preferred embodiment, the housing 20 may be formed of a single housing component which may dispense with the need to assemble the housing 20 about the pipe sections 92' as described above. Such an embodiment would include pipe sections as an integral part of the housing 20. Further, a single housing assembly would also facilitate the use of a single component guide track and, therefore, eliminate the alignment procedures involved with the use of the guide track components described above.

While the housing 20 and its components are described and are illustrated as shown above, it is important to note that the housing 20, along with any of the housing components 21 and 22 may be made or formed in any suitable shape or size as long as the housing 20 may be installed in the motor vehicle exhaust system and as long as the apparatus 1 may be operated in an appropriate manner.

The anti-theft apparatus 1, in the preferred embodiment, is operated in the manner described below and with reference to FIGS. 9A–9D. FIG. 9A illustrates a top sectional view of the housing 20 of the apparatus 1 installed in the vehicle exhaust system. In FIG. 9A, the blocking device 11 is shown initially in the "UNBLOCK" or "OPEN" position, also defined as "POSITION I". As can be seen in FIG. 9A, in the "UNBLOCK" or "OPEN" position, the blocking device 11 is located completely outside of, and therefore, does not block or cover any portion of the exhaust system or exhaust path 85. The flow of exhaust gases is illustrated by the arrows A in FIG. 9A. In FIG. 9A, the exhaust gases flow freely through the exhaust system and through the housing 20.

FIG. 9B illustrates a cross sectional view of the housing 20 installed in the exhaust system which shows that the exhaust path 85 which is also defined by the cutout or passageway 23, is completely clear of any blockage by the blocking device 11 which is clearly located outside of the exhaust path 85. When it is desired to "BLOCK" or to "CLOSE" the vehicle's exhaust system, an authorized user selects this operation by depressing, or by otherwise actuating, the "BLOCK" or "CLOSED" button 2A of the transmitter 2.

Upon the selection of the "BLOCK" or "CLOSED" operation, the transmitter 2 will transmit an appropriately secured wireless signal to the receiver 3 which is located inside the housing 20. Upon receipt of the signal by the receiver 3, the CPU 4 will read and identify the received signal and will actuate the blocking device moving means 7, and, in particular, the DC motor 9 utilized thereby so as to initiate DC motor operation in a first direction whereby the blocking device 11 will be moved, via DC motor 9 and linkage 10, in the direction towards the "BLOCK" or "CLOSED" position.

The DC motor 9, via connector 81, will move or displace the linkage 10 along the track 75, located in and on the interior housing 80. The linkage 10, via connector 82, will move or displace the blocking device 11 along the guide track 60, in the direction shown by arrow C in FIG. 9C. The blocking device 11 will be moved or displaced until the blocking device 11 reaches the end of the guide track 60, which is defined as the "BLOCK" or "CLOSED" position, also referred to as "POSITION II". FIG. 9C illustrates a top sectional view of the housing 20 of the apparatus 1 with the blocking device 11 shown in the "BLOCK" or "CLOSED" position.

When the blocking device 11 reaches POSITION II, it will make contact with, and trigger, sensor switch 14 which is connected to the CPU 4. The CPU 4 will then shut off the DC motor 9. The CPU 4 will also reset sensor switch 13 which may have been previously actuated. It is important to note that, in the embodiment described, the blocking device 11 travels transverse to the flow of the exhaust gases. It is, however, envisioned that the housing 20 may also be installed at an angle to the exhaust pipe 92 so that a non-transverse direction is also possible and equally as effective.

The blocking device 11 will, at this position, be in the "BLOCK" or "CLOSED" position (POSITION II) thereby blocking off, or sealing off, the flow of exhaust gases through the exhaust system, and thereby preventing the release of the engine's exhaust gases into the atmosphere. The flow of exhaust gases, as illustrated by the arrow B in FIG. 9C, is blocked so that the gases are contained within the exhaust pipe 92 by, and on one side of, the blocking device 11 and, therefore, cannot be released into the atmosphere. In this manner, the release of exhaust gases into the atmosphere is prevented or, at least, severely hampered.

FIG. 9D illustrates a cross sectional view of the housing 20 installed in the exhaust system which shows the exhaust path 85, or cutout or passageway 23 completely blocked off or sealed off by the blocking device 11. As noted above, additional seals (not shown) may be utilized and located along the guide track 60 so as to provide additional sealing off of the exhaust system in the areas where the guide track 60 and the blocking device 11 are adjacent one another when the blocking device 11 is located at POSITION II.

When it is desired to "UNBLOCK" or "OPEN" the exhaust system, such as when an authorized user desires to use the vehicle, the authorized user selects this operation by depressing, or by otherwise activating, the "UNBLOCK" or "OPENS" button 2B of the transmitter 2. Upon the actuation of the "UNBLOCK" or "OPEN" button 2B, the transmitter 2 will transmit an appropriately secured wireless signal(s) to the receiver 3. Upon receipt of the transmitted signal by the receiver 3, the CPU 4 will read and identify the received signal and will actuate the blocking device moving means 7, and in particular, the DC motor 9, so as to operate the DC motor 9 in a second direction which is in the direction opposite the first direction described above. The DC motor 9, in conjunction with the linkage 10, will move or displace the blocking device 11, along the guide track 60, in the direction shown by arrow D in FIG. 9C, until the blocking device 11 is returned to the "UNBLOCK" or "OPEN" Position (POSITION I) as shown in FIG. 9A.

When the blocking device 11 reaches the "UNBLOCK" or "OPEN" position, the blocking device or a portion thereof will make contact with, trigger, or depress the sensor switch 13 which is also connected to the CPU 4. Upon the receipt of this signal, the CPU 4 will shut off the DC motor 9. The CPU 4 will also reset sensor switch 14 which was previously actuated as described above. At this point, the blocking device 11 will again be in the "UNBLOCK" or "OPEN" position (POSITION I) as shown in FIGS. 9A and 9B and will be located completely outside of the exhaust path 85, or cutout or passageway 23, thereby allowing the exhaust gases to be released into the atmosphere, and thereby allowing the vehicle's engine to operate properly and without impedance.

In the above manner, an authorized user may selectively enable or disable a motor vehicle by selectively unblocking or blocking the exhaust system, respectively. In this regard, the apparatus 1 of present invention provides for an effective means by which to protect a motor vehicle from theft while overcoming the shortcomings of the prior art. The present invention provides for a complete blocking off, or sealing off, of the exhaust system, when desired, and dispenses with the need to permanently position a blocking device within the path of the exhaust gases.

FIG. 10A illustrates another preferred embodiment of the present invention wherein the housing, which is denoted by reference numeral 200, includes extension pipes 201 which are constructed into the housing 200, and in particular, into a cutout or passageway designated as an exhaust path. FIG. 10A illustrates a perspective view of the housing 200 which comprises extension pipes 201 which are connected to, or formed in, the housing 200. The extension pipes 201 should be physically attached to, or connected with, the housing 200. FIG. 10B illustrates a top view of the housing 200 of FIG. 10A showing the extension pipes located in cutout or passageway 203.

The housing 200 of FIGS. 10A and 10B facilitates a simplified assembly and dispenses with the need to assemble the housing and the guide track from the component parts as described above. Further, installation on the motor vehicle may be simplified as the housing 200 may be installed into the exhaust system by any one of the widely known methods and/or techniques which are known and employed in installing vehicle mufflers, catalytic converters and/or other exhaust system components or devices. In this manner, the housing 20 embodiment or the housing 200 embodiment may be equally preferred and may be freely selected depending upon the type of installation desired, the type of vehicle, the circumstances of use and/or installation, or by the user's or installer's preference.

FIG. 10C illustrates a top view of the housing 200 of the embodiment of FIG. 10A and 10B installed in an exhaust system, and in particular, between exhaust pipe sections 92' using appropriate connector sleeves 208.

It is also envisioned that the CPU 4 of the present invention may be programmable so as to render the vehicle inoperable, or in a "Normally Blocked" mode during certain time periods or so as to render the vehicle inoperable once the vehicle engine has been shut off. Further, if used in conjunction with a telephone/telephone beeper system, or other intermediate to long range actuation means, it may be possible to control the apparatus from a remote location, and/or to provide user programming and reprogramming of the CPU 4 and apparatus operations. The CPU 4 may also be connected to the vehicle operating computer or to an alarm or other security system so as to provide for additional and/or supplemental control over the apparatus 1 and/or it serve as a means for providing additional anti-theft protection.

In yet another embodiment of the present invention, the apparatus components, which are located in the housing, may be integrally fabricated and/or constructed within a vehicle muffler, exhaust manifold, catalytic converter, or other suitable exhaust system component or device. FIG. 11A illustrates a typical motor vehicle muffler from a top sectional view. In FIG. 11A, the conventional or typical motor vehicle muffler, which is denoted by the reference numeral 300, comprises a muffler housing 301, which houses the muffler device 302, and extension pipes 303 which extend from each end of the housing 301.

FIG. 11B illustrates an alternate embodiment of the present invention, from a top sectional view, wherein the components of the apparatus which are located in the housing, collectively denoted by the reference numeral 305, are integrally constructed within the muffler housing 301. In FIG. 11B, the components of the apparatus 305 are installed or integrated into the housing 301 between a first of the extension pipes 303 and an intermediate pipe 304 which connects the components 305 with the muffler device 302. Appropriate and concealed electrical connections would also have to made so as to properly secure and protect the electrical connections to the apparatus components 305 in this embodiment.

It is also envisioned, however, that external electrical connections could be dispensed with in any of the embodiments disclosed herein if appropriate and suitable batteries and/or other power sources are, or can be, installed inside the housing of the apparatus or the muffler, whichever the case may be.

In the embodiment of FIG. 11B, the apparatus components 305, which are built into the muffler 300, are further concealed from a would-be thief. Further, means or devices for providing greater security for the muffler would also serve to provide greater security for the apparatus of the present invention. Lastly, installation and/or repairs of, and to, the apparatus may be simplified and may be made more convenient. In this regard, the apparatus of the present invention may be utilized to create an anti-theft muffler.

In yet another alternate embodiment, the apparatus components which are located in the housing may be integrally constructed within an engine exhaust manifold.

FIG. 12A illustrates a typical motor vehicle exhaust manifold from a side sectional view. In FIG. 12A, the conventional or typical motor vehicle exhaust manifold, which is denoted by the reference numeral 350 comprises cylinder exhaust pipes 351, which feed into the manifold exhaust pipe 352. A mating flange 353, for attachment to an exhaust pipe is also shown in FIG. 12A.

FIG. 12B illustrates an alternate embodiment of the present invention, from a side sectional view, wherein the apparatus components, collectively denoted by the reference numeral 355, are integrally constructed within the exhaust manifold 350. In FIG. 12B, the apparatus components 355 are installed in the exhaust pipe 352 of the exhaust manifold 350 as shown. It is noted from FIG. 12B, that the apparatus components are located within a housing portion 356.

In the embodiment of FIG. 12B, appropriate and concealed electrical connections would also have to made so as to properly secure and protect the electrical connections of the apparatus components 355 in this embodiment. In the embodiment of FIG. 12B, wherein the housing components 355 are built into the exhaust manifold 350, the housing components 355 would be further concealed from a would-be thief. Further, means or devices for providing greater security for the exhaust manifold would also serve to provide greater security for the apparatus of the present invention. Lastly, installation and/or repairs may be simplified and may be made more convenient. In this manner, an anti-theft exhaust manifold is created.

In yet another embodiment, the apparatus of the present invention may be adapted to, and may be utilized in conjunction with, a vehicle fuel supply line so as to provide a means for blocking off, or sealing off, the flow of fuel from the vehicle's fuel tank to the vehicle's engine.

FIG. 13 illustrates an appropriately sized embodiment of the housing 20 of the apparatus 1 which could be adapted to, and installed in, a vehicle fuel line. FIG. 13 illustrates a vehicle fuel line illustrating the vehicle fuel tank 400, the fuel line 401, the vehicle engine 402 and the vehicle fuel input device 403 which is typically a carburetor or a fuel injection device. The housing 20 of the apparatus 1 is installed within the fuel line as shown in FIG. 13. The housing 20 which is utilized in a fuel line may be installed in any appropriate manner and operated in a manner analogous to that described hereinabove.

It is also possible to utilize more than one apparatus, housing, or a set of housings having associated components, in a motor vehicle exhaust system so as to provide further enhanced protection. In such an instance, each of the plurality of apparatus, or sets of housing components, may be actuated separately or by a central control means.

The present invention may also be utilized in vehicles having a plurality of exhaust branches and/or passageways, such as in dual exhaust systems, wherein a housing and associated components is installed in each of the exhaust branches. In such a case, the components of the housings can be actuated simultaneously from a common transmitter or actuation means.

It is also envisioned to utilize an audible and/or visual indication devices and/or means so as to indicate apparatus status and/or operating conditions and/or operations.

The apparatus of the present invention may also be adapted for use in conjunction with any combustion engine-powered vehicle such as trucks, buses, aircraft, boats, etc. so as to prevent or to thwart the theft thereof.

While the present invention has been described and illustrated in various preferred embodiments, such are merely illustrative of the present invention and are not to be construed to be limitations thereof. Accordingly, the present invention encompasses any and all modifications, variations and/or alternate embodiments with the scope of the present invention limited only by the claims which follow.

What is claimed is:

1. An anti-theft apparatus, which comprises:
   a blocking element for blocking the flow of exhaust gases;
   a device for moving said blocking element;
   a control device for controlling one of said apparatus and said moving device;
   an activation device for activating an operation of one of said apparatus and said control device; and
   a housing for housing at least one of said blocking element, said moving device and said control device,
   wherein said moving device one of moves and displaces said blocking element between a first position, whereat said blocking element is removed from the flow path of exhaust gases, and a second position, whereat said blocking element is in the flow path of exhaust gases.

2. The apparatus of claim 1, wherein said activation device further comprises:
   a receiver for receiving signals from a remote location; and
   a transmitter for transmitting signals to said receiver.

3. The apparatus of claim 2, wherein said transmitter is a telephone signal transmitting device, and further wherein said receiver is a telephone signal receiving device.

4. The apparatus of claim 1, wherein said moving device further comprises:
   one of an electric motor and a reversible electric motor; and
   a linkage element for mechanically one of linking and connecting said electric motor with said blocking element.

5. The apparatus of claim 1, wherein said apparatus is one of controlled and activated by a vehicle computer system, a vehicle alarm system, a vehicle security system, a vehicle keyless entry system, a remote control device, a communication device, a telephone and a switching device.

6. The apparatus of claim 1, wherein said apparatus further comprises:

a sensing device for sensing one of position and location of said blocking element.

7. The apparatus of claim 1, wherein said moving device comprises at least one of an electrical device, an electro-mechanical device, an hydraulic device, a pneumatic, device and a vacuum device.

8. The apparatus of claim 1, which further comprises one of a power supply and an auxiliary power supply.

9. The apparatus of claim 8, which further comprises:

a device for sensing a power supply one of interruption and disconnection.

10. The apparatus of claim 1, wherein said activation device comprises at least one of a switch, a key, a keypad, a card, a card reader, an optical reader, a keyless activation device, a proximity card and associated card reader, a bar code card and associated card reader, a magnetic card and associated card reader, a key and associated key reader and a swipe card and associated card reader.

11. The apparatus of claim 1, which further comprises:

a guiding device for one of guiding and supporting said blocking element.

12. The apparatus of claim 1, wherein said control device further comprises:

a central processing unit; and a memory device.

13. The apparatus of claim 1, wherein said housing one of has a cutout formed therein and extension elements formed thereon for facilitating installation of said housing in one of an exhaust system and an exhaust system component.

14. The apparatus of claim 1, which further comprises:

one of an audible and a visual indication device for providing an indication of one of apparatus status and operation.

15. The apparatus of claim 1, which further comprises:

a sealing element for preventing one of gases, gas particles and contaminants from entering said housing.

16. The apparatus of claim 1, wherein said blocking element is composed of one of stainless steel, steel, brass, aluminum, plastic, hard plastic and a composite material.

17. The apparatus of claim 1, wherein said blocking element is formed integrally within one of a muffler, an exhaust manifold, a catalytic converter and an exhaust system one of device and component.

18. An anti-theft apparatus, which comprises:

a blocking element for blocking the flow of exhaust gases;

a device for moving said blocking element;

a control device for controlling one of said apparatus and said moving device;

wherein said moving device one of moves and displaces said blocking element between a first position, whereat said blocking element is removed from the flow path of exhaust gases, and a second position, whereat said blocking element is in the flow path of exhaust gases, and further wherein the operation of one of said apparatus and said control device is programmable.

19. A method for preventing a theft of a vehicle, which comprises the steps of:

activating a blocking element moving device upon one of the occurrence of a pre-defined event, the presence of a pre-defined condition and at a pre-defined time; and moving a blocking element with the blocking element moving device from a first position, whereat the blocking element is outside the flow path of exhaust gases, to a second position, whereat the blocking element is in the flow path of exhaust gases.

20. The method of claim 19, further comprising the steps of:

activating the blocking element moving device upon one of the occurrence of a pre-defined event, the presence of a pre-defined condition and at a pre-defined time; and moving the blocking element with the blocking element moving device from said second position, whereat the blocking element is in the flow path of exhaust gases, to said first position, whereat the blocking element is outside the flow path of exhaust gases.

* * * * *